I. Roberge,
Horse Shoe.
No. 90,394.   Patented May 25, 1869.
Fig. 1.
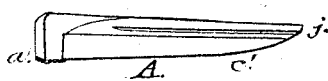
Fig. 2.
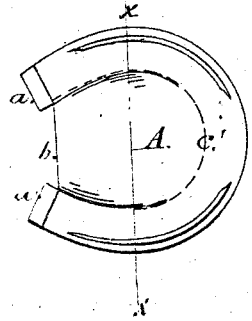
Fig. 3.
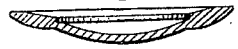
Fig. 4.
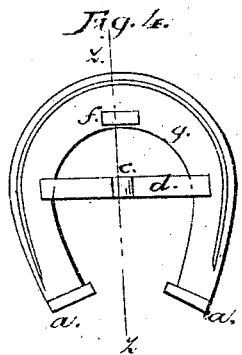
Fig. 5.
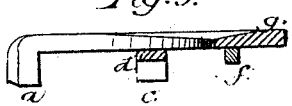
Fig. 6.
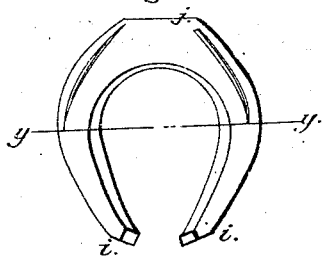
Fig. 7.
Witnesses:
D. P. Cowl
Jno. D. Patten
Inventors:
David Roberge
L. W. Serrell
attys.

United States Patent Office.

DAVID ROBERGE, OF MOOERS, NEW YORK.

Letters Patent No. 90,394, dated May 25, 1869.

---

IMPROVEMENT IN HORSESHOES.

---

The Schedule referred to in these Letters Patent and making part of the same.

---

*To all whom it may concern:*

Be it known that I, DAVID ROBERGE, of Mooers, in the county of Clinton, and State of New York, have invented and made a certain new and useful Improvement in Horseshoes; and I do hereby declare the following to be a full, clear, and exact description of the said invention, reference being had to the annexed drawing, making part of this specification, wherein—

Figure 1 is a side view of my improved shoe, adapted to soft ground or light work;

Figure 2 is an inverted plan of the same; and

Figure 3 is a cross-section at the line $x\,x$.

Figure 4 is an inverted plan of my central calk-shoe, to be employed as a preliminary, or test-shoe; and Figure 5 is a section of the same at the line $z\,z$.

Figure 6 is an inverted plan of the shoe, similar to that in fig. 1, but without the convex central plate, and Figure 7 is a section of the same at the line $y\,y$.

From very extensive experience I have discovered, that in most intances, the lameness of horses, or the defects of their limbs, arise from the hoof not taking a proper bearing upon the surface on which the horse stands. It is well known that the horse stands upon a level, or nearly level surface, the majority of the time; hence, if the shoe is of the ordinary character, with three bearing-points, the hoof will stand in a given position, regardless of whether that is the natural position of the foot to the rest of the limb or not; hence, in cases where the shoe is not properly made, the weight of the horse may, and frequently does come upon the knuckle of a joint, or upon a cord, or tendon, or muscle, unduly or principally, either injuring that immediate part, or producing some incidental injury.

In this manner the horse is often sprained in the ankle, the knees, shoulders, or haunches, and the defects, or diseases known as "founder," "calk-joint," "ring-bone," and analogous difficulties, have their origin.

My invention is to prevent these diseases, remove them, or amelioriate the defects of long-standing cases.

To effect these objects, I first make use of the test-shoe, shown in figs. 4 and 5, the same being made with the hind calks $a\,a$, cross-bar $d$, and centre calk $c$.

$f$ is a short toe-calk, set towards the back or inner edge of the shoe $g$.

The calk $c$ is made of about the same length as the other calks $a\,a$, and is placed as nearly as possible below the ball, or centre of the ankle-joint of the hoof, so that the weight of the animal is taken directly thereon, and the hoof is free to assume a position that is the most comfortable for the other parts of the limb.

I prefer to apply this shoe in the first instance, and in it an injured horse can walk with comparative ease, and frequently go to his labor immediately.

By wearing this shoe for a few days, it can be ascertained what position the under side of the hoof should stand to the level surface, because this calk $c$ becomes a pivot, and the foot, when at rest, has no leverage against it to distort any of the joints, muscles, or tendons, and a measurement can be taken, and a shoe made therefrom, so that the hoof will bear on the surface in the most comfortable position.

This may necessitate the use of one calk only at the rear, but, under almost all circumstances, it is necessary to make the shoe thin at the front edge $j$, and thicker at the rear portions $i\,i$, as seen in figs. 1 and 6, and to apply calks $a\,a$, as in fig. 1, to raise up the rear portion of the hoof.

In this last-named case, the metal plate A is employed, the same being formed with, or attached to the shoe, and made convex on its under side, and thin towards the front part $c'$. The rear portion $p$ may be removed near the frog, the convexity at the rear end being almost as great as the depth of the calks.

This shoe, having a convex under surface, allows the hoof to assume any desired angle to the surface on which the animal is standing; hence there is but little strain on any one part, the weight and strain being equally proportioned upon the parts of the legs.

It will be evident that this shoe gives a central bearing for the hoof, allowing it to assume the most natural position, and in use the hoof rolls upon the shoe in both a forward and partially sidewise direction, so that the joints cannot be wrenched or strained.

It will also be evident, that if the calk $c$ is placed further forward than the position shown, it must be made shorter, and that the shoe must be thinned sufficiently, toward both the front and side edges, to give the bearing as far in beneath the foot as advantageous for the aforesaid action.

I do not claim a horseshoe made with a frame, or extension for animals that are shorter in one leg than the other; neither do I claim a shoe in which the calks are the same length, or nearly so, on any part of the shoe itself.

What I claim, and desire to secure by Letters Patent, is—

A horseshoe, in which the weight of the animal is taken upon a central support, in the manner specified, so as to allow the hoof to conform to the position required by the other parts of the leg, as set forth.

DAVID ROBERGE.

Witnesses:
FRANK BLOCKLEY,
ALEX. F. ROBERTS.